United States Patent Office 3,623,183
Patented Nov. 30, 1971

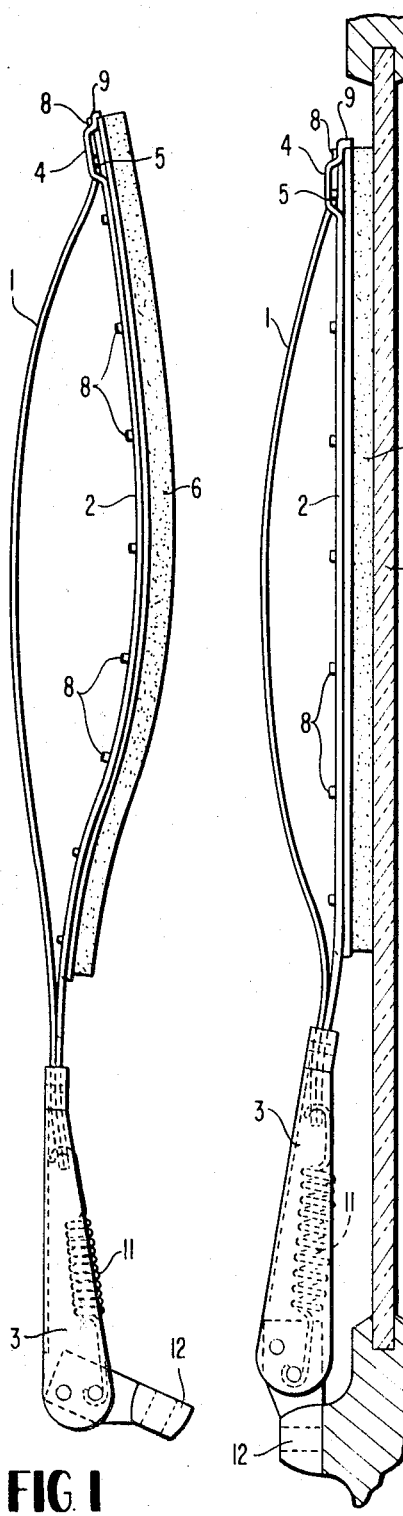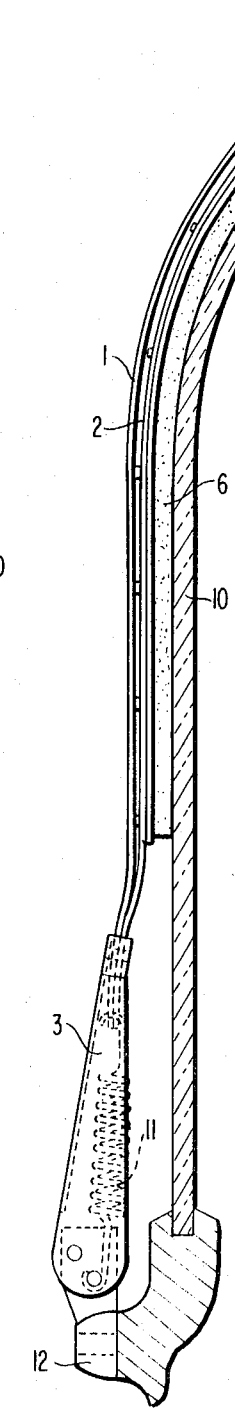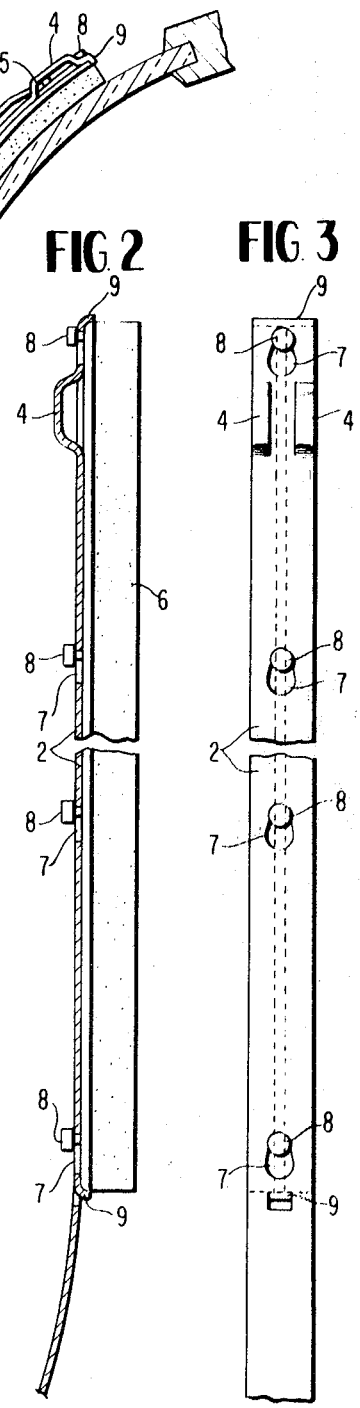

3,623,183
WINDSHIELD WIPERS, ESPECIALLY FOR MOTOR VEHICLES
Karl Wilfert, Gerlingen-Waldstadt, and Rudolf Andres, Sindelfingen, Germany, assignor to Daimler-Benz Aktiengesellschaft, Stuttgart-Unterturkheim, Germany
Filed Oct. 30, 1969, Ser. No. 872,711
Claims priority, application Germany, Nov. 2, 1968, P 18 06 719.1
Int. Cl. B60s 1/02
U.S. Cl. 15—250.42                      18 Claims

ABSTRACT OF THE DISCLOSURE

A windshield wiper, particularly for motor vehicles, in which an elastic wiper blade is adapted to be connected with a first element which in turn is connected with a second element; the two elements possess the properties of bending springs and, with the wiper blade not resting on the windshield are such that the element connected with the wiper blade has an approximately S-shaped configuration while the other element is curved outwardly.

---

The present invention relates to a windshield wiper, especially for motor vehicles, with an elastic wiper blade, and with a mechanism acting on the back thereof and initiating an abutment pressure.

Windshield wipers of the most different types of constructions are already known in the prior art for both flat as also curved windshields. Whereas, with flat windshield panes the wiper blade is carried for the most part by a rigid rail, in case of curved windshield panes, the wiper blade must be able to adapt itself to the respective windshield curvature. This leads to a construction of the windshield wipers in which the abutment pressure is transmitted to the windshield wiper blade by way of a main bar or holder and, for the most part, by way of several intermediate bars or holders.

This prior art transmission mechanism provided with several jointed places entails a number of disadvantages which express themselves, inter alia, in that the main and intermediate bars or holders consisting, for the most part, of a U-profile become frequently clogged with ice and snow during the winter. As a result thereof, in addition to a reduction of the abutment pressure, also the flexibility of the wiper blade is reduced so that the wiping effect is strongly reduced.

A further disadvantage of these windshield wipers resides in that these prior art windshield wipers offer a large lateral surface for engagement by the air whereby at higher velocities a reduction of the abutment pressure and even a lifting off of the wiper blades may take place.

It is an aim of the present invention to create a windshield wiper which does not possess the aforementioned disadvantages and which harmonizes well with the form and shape of the motor vehicle.

Accordingly, a windshield wiper, especially for motor vehicles with an elastic wiper blade and a mechanism acting on the back side thereof and introducing an abutment pressure is proposed in which, according to the present invention, two bands or straps with the properties of a bending spring are provided which are so shaped with the wiper blade not resting on the windshield that the one band or strap opposite the wiper blade extends curved outwardly and the other band or strap, receiving the wiper blade, is pre-bent approximately S-shaped.

In a preferred embodiment of the present invention, the band or strap connected with the wiper blade is provided at its end remote from the drive with two longitudinally directed, oppositely arranged and bent-up webs, between which the band or strap opposite the wiper blade engages longitudinally displaceably and pivotably by means of two symmetrically arranged slots whereby both bands or straps are mounted on the side thereof near the drive in a pivotally arranged holding or support means of conventional construction.

In order that an easily adaptation to the differing inclinations of the windshield is made possible, the end of the wiper blade near the drive means has a predetermined spacing with respect to the pivotal mounting or support means.

A simple securing of the wiper blade is achieved if the strap or band provided with the bent-up webs includes centrally arranged mounting or receiving means in the form of shaped apertures distributed over its length, which are so constructed that approximately mushroom-shaped extensions projecting from the back side of the wiper blade are inserted through the receiving or mounting means and upon longitudinal displacement of the wiper blade, are seized or gripped from below by the edges of the apertures.

It is furthermore advantageous if the band or strap connected with the wiper blade is equipped with at least two abutments projecting therefrom, by means of which a loosening of the wiper blade during the wiper operation is precluded.

Accordingly, it is an object of the present invention to provide a windshield wiper, especially for motor vehicles, which avoids by simple means the aforementioned shortcomings and drawbacks encountered in the prior art.

Another object of the present invention resides in a windshield wiper, especially for motor vehicles, which minimizes the danger of a reduction of abutment pressure and/or flexibility of the wiper blade under certain operating conditions.

Still another object of the present invention resides in a windshield wiper assembly which can be manufactured by simple means and can be readily assembled and disassembled, particularly as regards exchange of worn wiper blades.

Still a further object of the present invention resides in a windshield wiper for motor vehicles in which the wiper blades are assembled in a simple manner yet are safely secured against inadvertent loosening during wiper operation.

These and further objects, features, and advantages of the present invention will become more obvious from the following description when taken in connection with the accompanying drawing which shows, for purposes of illustration only, one embodiment in accordance with the present invention, and wherein:

FIG. 1 is a windshield wiper according to the present invention in the non-installed condition;

FIG. 2 is a side view of FIG. 1, illustrating a mounting and securing possibility of the wiper blade on its holder member;

FIG. 3 is a plan view of the wiper sub-assembly according to FIG. 2; and

FIGS. 4 and 5 are elevational views illustrating the abutment of the wiper blade in accordance with the present invention at differently shaped windshields.

Referring now to the drawing wherein like reference numerals are used throughout the various views to designate like parts, the windshield wiper illustrated in FIG. 1 consists of an outwardly curved strap or band 1 and of an approximately S-shaped strap or band 2. Both straps or bands possess the properties of a bending spring and are securely connected at the ends thereof near the drive with a conventional pivotally arranged mounting means 3. At the ends of the windshield wipers remote from the drive the connection of the straps or bands 1 and 2 takes place in that the strap or band 2 is provided with two bent-up web portions 4 extending in the longitudinal direction and arranged opposite one another, into which engages the strap or band 1 in a longitudinally displaceable and pivotal manner by means of two symmetrically arranged slots 5. The wiper blade 6, as can be seen from FIGS. 2 and 3, is disengageably or detachably connected with the strap or band 2 and, for that purpose, is provided with centrally arranged receiving or mounting means in the form of apertures 7 distributed over its length, into which can be inserted the approximately mushroom-shaped extensions 8 projecting from the back side of the wiper blade 6. By longitudinal displacement of the wiper blade 6, the extensions 8 are engaged from below by the obliquely converging edges of the apertures 7 whereby an anchoring with the strap or band 2 takes place. In order that a loosening of the wiper blade 6 is prevented during the operation, two abutments 9 project from the strap 2 which, as can be seen in particular from FIG. 2, effect a clamping of the wiper blade 6.

The windshield wiper abutting in FIGS. 4 and 5 at differently shaped sections of a windshield 10 is pressed approximately uniformly over the entire length of its wiper blade 6 against the different sections of the windshield 10. The abutment pressure exerted on the windshield 10 is slightly larger at eye level by reason of the particular construction of the strap or band 2 in order that in particular within this area a completely satisfactory wiping takes place. The abutment pressure is initiated by a draw-spring 11, which on the one hand, is hooked into the ends of the bands or straps 1 and 2 near the drive and which, on the other, is received by a pin of a drive lug 12 that is pivotally connected with the mounting means 3. The introduction of the abutment pressure takes place by way of the mounting means 3 to the band or strap 1 and the band or strap 2 and from there to the wiper blade 6. The end of the wiper blade 6 near the drive has a predetermined distance with respect to the pivotal mounting means 3. A particularly good adaptation of the windshield wiper to the different window inclinations is achieved by the resulting flexible area.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are within the scope of those skilled in the art.

We claim:

1. A windshield wiper with an elastic wiper blade and a means introducing an abutment pressure and acting on the back side thereof, characterized in that said means includes two flexible means possessing the properties of a bending spring, said two flexible means being so formed with the wiper blade not resting against the windshield that the one flexible means opposite the wiper blade is curved outwardly and the other flexible means receiving the wiper blade is pre-bent approximately S-shaped.

2. A windshield wiper according to claim 1, characterized in that said flexible means are band-like elements.

3. A windshield wiper according to claim 1, characterized in that said other flexible means is provided at its end remote from the drive with two longitudinally directed, oppositely arranged and bent-up web means, between which the one flexible means engages longitudinally displaceably and pivotally by two substantially symmetrical slot means, and in that both flexible means are mounted at the side near the drive in a pivotal mounting means.

4. A windshield wiper according to claim 3, characterized in that the end of the wiper blade near the drive is at a certain distance with respect to the pivotal mounting means.

5. A windshield wiper according to claim 4, characterized in that said other flexible means is provided with receiving means arranged substantially centrally and distributed over its length which are so shaped that approximately mushroom-shaped extensions projecting from the back of the wiper blade can be inserted into the receiving means and that by longitudinal displacement of the wiper blade, the mushroom-shaped extensions are engaged from below by the edges of the receiving means.

6. A windshield wiper according to claim 5, characterized in that said receiving means have converging edges so as to form an aperture of decreasing width in the longitudinal direction of said other flexible means.

7. A windshield wiper according to claim 6, characterized in that said other flexible means is provided with at least two abutments projecting therefrom, by means of which a loosening of the wiper blade during the wiping operation is prevented.

8. A windshield wiper according to claim 7, characterized in that said flexible means are band-like elements.

9. A windshield wiper according to claim 1, characterized in that said other flexible means is provided with receiving means arranged substantially centrally and distributed over its length which are so shaped that approximately mushroom-shaped extensions projecting from the back of the wiper blade can be inserted into the receiving means and that by longitudinal displacement of the wiper blade, the mushroom-shaped extensions are engaged from below by the edges of the receiving means.

10. A windshield wiper according to claim 9, characterized in that said receiving means have converging edges so as to form an aperture of decreasing width in the longitudinal direction of said other flexible means.

11. A windshield wiper according to claim 9, characterized in that said other flexible means is provided with at least two abutments projecting therefrom, by means of which a loosening of the wiper blade during the wiping operation is prevented.

12. A windshield wiper according to claim 1, characterized in that said other flexible means is provided with at least two abutments projecting therefrom, by means of which a loosening of the wiper blade during the wiping operation is prevented.

13. A windshield wiper according to claim 1, characterized in that the other flexible means is pre-bent into the shape of a single S.

14. A windshield wiper according to claim 1, characterized in that the other flexible means includes means for removably receiving the wiper blade.

15. A windshield wiper with an interchangeable elastic wiper blade and a means introducing an abutment pressure and acting on the back side thereof, characterized in that said means includes two flexible means possessing the properties of a bending spring, said two flexible means being so formed with the wiper blade not resting against the windshield that the one flexible means opposite the wiper blade is curved outwardly and the other flexible means receiving the wiper blade is pre-bent so as to curve oppositely of the one flexible means.

16. A windshield wiper according to claim 15, characterized in that said other flexible means is provided at its end remote from the drive with two longitudinally directed, oppositely arranged and bent-up web means, between which the one flexible means engages longitudinally displaceably and pivotally by two substantially symmetrical slot means, and in that both flexible means are mounted at the side near the drive in a pivotal mounting means.

17. A windshield wiper according to claim 16, characterized in that end of the wiper blade near the drive is at a certain distance with respect to the pivotal mounting means, said other flexible means is provided with receiving means arranged substantially centrally and distributed over its length which are so shaped that approximately mushroom-shaped extensions projecting from the back of the wiper blade can be inserted into the receiving means and that by longitudinal displacement of the wiper blade, the mushroom-shaped extensions are engaged from below by the edges of the receiving means.

18. A windshield wiper according to claim 17, characterized in that said other flexible means is provided with at least two abutments projecting therefrom, by means of which a loosening of the wiper blade during the wiping operation is prevented.

References Cited

UNITED STATES PATENTS

| | | | |
|---|---|---|---|
| 2,659,097 | 11/1953 | Morton | 15—250.36 X |
| 2,727,270 | 12/1955 | Bosso | 15—250.42 |
| 2,964,776 | 12/1960 | Ryck | 15—250.42 |
| 3,192,551 | 7/1965 | Appel | 15—250.36 |

PETER FELDMAN, Primary Examiner